(12) United States Patent
Kanzaki et al.

(10) Patent No.: US 9,493,860 B2
(45) Date of Patent: *Nov. 15, 2016

(54) CHROMIUM-CONTAINING AUSTENITIC ALLOY

(71) Applicant: NIPPON STEEL & SUMITOMO METAL CORPORATION, Tokyo (JP)

(72) Inventors: Manabu Kanzaki, Tokyo (JP); Yasuyoshi Hidaka, Tokyo (JP); Yasuhiro Masaki, Tokyo (JP); Akihiro Uehira, Tokyo (JP); Osamu Miyahara, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 66 days.

This patent is subject to a terminal disclaimer.

(21) Appl. No.: 14/390,058

(22) PCT Filed: Mar. 28, 2013

(86) PCT No.: PCT/JP2013/059194
§ 371 (c)(1),
(2) Date: Oct. 2, 2014

(87) PCT Pub. No.: WO2013/150947
PCT Pub. Date: Oct. 10, 2013

(65) Prior Publication Data
US 2015/0064454 A1 Mar. 5, 2015

(30) Foreign Application Priority Data

Apr. 4, 2012 (JP) ................. 2012-085137

(51) Int. Cl.
| | | |
|---|---|---|
| *C22C 19/05* | (2006.01) | |
| *G21D 1/00* | (2006.01) | |
| *C23C 8/14* | (2006.01) | |
| *C23C 8/18* | (2006.01) | |
| *C22C 38/00* | (2006.01) | |
| *C22F 1/00* | (2006.01) | |
| *C22F 1/10* | (2006.01) | |
| *F22B 37/10* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/50* | (2006.01) | |
| *C21D 6/00* | (2006.01) | |

(52) U.S. Cl.
CPC ............. *C22C 19/058* (2013.01); *C21D 6/004* (2013.01); *C22C 19/05* (2013.01); *C22C 38/00* (2013.01); *C22C 38/001* (2013.01); *C22C 38/02* (2013.01); *C22C 38/04* (2013.01); *C22C 38/06* (2013.01); *C22C 38/42* (2013.01); *C22C 38/50* (2013.01); *C22F 1/00* (2013.01); *C22F 1/10* (2013.01); *C23C 8/14* (2013.01); *C23C 8/18* (2013.01); *F22B 37/107* (2013.01); *G21D 1/006* (2013.01); *G21D 1/00* (2013.01); *Y02E 30/40* (2013.01); *Y10T 428/265* (2015.01)

(58) Field of Classification Search
None
See application file for complete search history.

(56) References Cited

U.S. PATENT DOCUMENTS

| | | | |
|---|---|---|---|
| 5,456,768 A | 10/1995 | Tomari et al. | |
| 5,656,099 A | 8/1997 | Ohmi | |
| 5,817,424 A | 10/1998 | Ohmi | |
| 6,612,898 B1 | 9/2003 | Ohmi et al. | |
| 9,255,319 B2* | 2/2016 | Masaki | G21F 9/28 |
| 2009/0123775 A1* | 5/2009 | Kanzaki | C22C 19/05 428/586 |
| 2013/0206272 A1* | 8/2013 | Masaki | C22C 19/05 138/143 |
| 2015/0322560 A1* | 11/2015 | Masaki | C21D 1/76 428/336 |

FOREIGN PATENT DOCUMENTS

| | | |
|---|---|---|
| CA | 2371312 | 9/2002 |
| CA | 2657782 | 1/2008 |
| CA | 2 807 525 | 3/2012 |
| CN | 101421431 | 4/2009 |
| EP | 0 512 782 | 11/1992 |
| EP | 2 053 683 | 4/2009 |
| EP | 2 835 442 | 2/2015 |
| JP | 64-055366 | 3/1989 |
| JP | 08-029571 | 2/1996 |
| JP | 08-060307 | 3/1996 |
| JP | 2991050 | 12/1999 |
| JP | 2000-208431 | 7/2000 |
| JP | 2002-121630 | 4/2002 |
| JP | 2002-322553 | 11/2002 |
| JP | 2002-348655 | 12/2002 |

(Continued)

OTHER PUBLICATIONS

JP 07-197207A_MT Aug. 1, 1995.*
JP 08-060307A_MT Mar. 5, 1996.*
Katsuhisa Sugimoto, "Pinhole Defect . . . Thin Film", Zairyo-To-Kankyo/Corrosion Engineering of Japan, 44 (1995), pp. 259-261.

*Primary Examiner* — Vera Katz
(74) *Attorney, Agent, or Firm* — Clark & Brody

(57) ABSTRACT

There is provided a chromium-containing austenitic alloy wherein at least one surface of the surfaces of the alloy has a continuous chromium oxide film with a thickness of 5 nm or more and less than 50 nm. A maximum current density determined by a critical passivation current density method is 0.1 μA/cm² or less when the chromium oxide film is continuous. A chemical composition of a base metal preferably consists of, by mass percent, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

2 Claims, No Drawings

(56) References Cited

FOREIGN PATENT DOCUMENTS

| JP | 2006-164824 | 6/2006 |
|---|---|---|
| JP | 2007-131921 | 5/2007 |
| JP | 2007-257883 | 10/2007 |
| JP | 2008-004267 | 1/2008 |
| JP | 2010-123475 | 6/2010 |
| JP | 2011-042862 | 3/2011 |
| WO | 2008/136306 | 11/2008 |
| WO | 2012/026344 | 3/2012 |

* cited by examiner

CHROMIUM-CONTAINING AUSTENITIC ALLOY

TECHNICAL FIELD

The present invention relates to a chromium-containing austenitic alloy and, more particularly, to a chromium-containing austenitic alloy excellent in general corrosion resistance in a high-temperature water environment such as a nuclear power plant.

BACKGROUND ART

For a steam generator tubing (hereinafter, referred simply as a "SG tubing") used for a nuclear power plant, chromium-containing austenitic alloys such as 600 alloys or 690 alloys have been used. This is because these alloys have excellent corrosion resistance in high-temperature water environments.

These members are used in an environment of high-temperature water of about 300° C., which is a nuclear reactor water environment, for several years to several tens of years. For the chromium-containing austenitic alloy used as a SG tubing for nuclear plant, although Ni is contained much, and therefore the corrosion resistance is excellent and the corrosion rate is low, a minute amount of Ni is released from a base metal by the long-term use.

In a process in which reactor water circulates, the released Ni is carried to a reactor core portion and receives neutron irradiation in the vicinity of fuel. When receiving neutron irradiation, Ni is converted into radioactive cobalt by nuclear reaction. This radioactive cobalt continues to release radiation for a long period of time because the half-life thereof is very long. Therefore, if the release amount of Ni is large, regular inspection cannot be started until the radiation dose emitted decreases to a proper value, so that the period of regular inspection extends, which results in an economic loss.

To reduce the amount of the released Ni from substrate is a very important issue in using a light water reactor for a long period of time. So far, therefore, by improving the corrosion resistance on the material side and by controlling the quality of reactor water, measures have been taken to suppress the release of Ni from the Cr-containing austenitic alloy.

Patent Document 1 discloses a method in which Ni-based alloy heat-transfer pipe is annealed in the temperature range of 400 to 750° C. in an atmosphere having a degree of vacuum of $10^{-2}$ to $10^{-4}$ Torr to form an oxide film consisting mainly of chromium oxides, whereby the general corrosion resistance is improved.

Patent Document 2 discloses a method for producing a member for nuclear plant, in which after the solution treatment of a Ni-based precipitation strengthened alloy, heating treatment is performed as at least part of age hardening treatment and oxide film forming treatment in an oxidizing atmosphere of $10^{-3}$ Torr to atmospheric pressure.

Patent Document 3 discloses a method for producing a Ni-based alloy product, in which a Ni-based alloy product is heat-treated in an atmosphere of hydrogen or a mixed atmosphere of hydrogen and argon, the atmosphere having a dew point of –60° C. to +20° C.

Patent Document 4 discloses a method for Miming a chromium-rich layer by exposing an alloy workpiece containing nickel and chromium to a gas mixture of water vapor and at least one kind of non-oxidizing gases.

Patent Document 5 discloses a method for producing a Cr-containing nickel-based alloy pipe, in which the Cr-containing nickel-based alloy pipe is treated in an atmosphere consisting of non-oxidizing gas containing oxidizing gas, whereby a chromium oxide film having a predetermined thickness is formed on the inner surface of pipe.

LIST OF PRIOR ART DOCUMENTS

Patent Document

Patent Document 1: JP64-55366A
Patent Document 2: JP8-29571A
Patent Document 3: JP2002-121630A
Patent Document 4: JP2002-322553A
Patent Document 5: WO2012/026344

Non-Patent Document

Non-Patent Document 1: Katsuhisa Sugimoto: Pinhole Defect Evaluation of Dry Coating TiN Thin Film, Zairyo-To-Kankyo/Corrosion Engineering of Japan, 44 (1995), pp. 259-261

DISCLOSURE OF THE INVENTION

Problems to be Solved by the Invention

The thicknesses of oxide films faulted by the methods described in Patent Documents 1-5 are as follows: 500 to 5000 Å in Patent Document 1, 1000 to 8000 Å in Patent Document 2, 180 to 1500 nm in Patent Document 3, 250 to 400 nm in Patent Document 4, and 50 to 1500 nm in Patent Document 5. Generally, if the film is thin, there is a tendency for corrosion resistance to decrease, and therefore, in the methods described in Patent Documents 1-5, a relatively thick film is formed to improve the release resistance.

On the other hand, in a product of chromium-containing austenitic alloy having a chromium oxide film, if the film is thick, cracking, peeling, and the like may occur when the alloy is subjected to working such as bending, and also the appearance is impaired. Therefore, the film is preferably as thin as possible.

The present inventors studied a method in which, concerning a chromium-containing austenitic alloy having a chromium oxide film, the metal release preventing effect is not impaired even if the thickness of film is decreased, and came to obtain the findings described below.

A cause for the decrease in release resistance at the time when the film is made thin is that the film is less liable to be formed continuously on the surface, and thereby a base metal is partially exposed.

Even if the thickness of chromium oxide film is less than 50 nm, forming a continuous film on the surface can provide a chromium-containing austenitic alloy having a high metal release resistance.

Means for Solving the Problems

The present invention was completed on the basis of the above findings, and involves the chromium-containing austenitic alloys described in the following (1) to (4).

(1) A chromium-containing austenitic alloy wherein at least one surface of the surfaces of the alloy has a continuous chromium oxide film with a thickness of 5 nm or more and less than 50 nm.

(2) The chromium-containing austenitic alloy according to (1), wherein a maximum current density determined by a critical passivation current density method is 0.1 µA/cm² or less.

The chromium-containing austenitic alloy according to (1) or (2), wherein a chemical composition of a base metal consists of, by mass percent, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

(4) The chromium-containing austenitic alloy according to any one of (1) to (3), wherein the alloy is used as a member for a nuclear plant.

The "chromium oxide film" means an oxide film consisting mainly of $Cr_2O_3$, and may contain oxides other than $Cr_2O_3$, such as $FeCr_2O_4$, $MnCr_2O_4$, $TiO_2$, $Al_2O_3$, and $SiO_2$. Also, if an oxide film consisting of chromium oxides is provided on the surface of the chromium-containing austenitic alloy, any other oxide layer may be formed on the upper layer (outside layer) and/or the lower layer (inside layer) of the chromium oxide layer.

Advantageous Effects of the Invention

According to the present invention, a chromium oxide film can be foamed on the surface of the chromium-containing austenitic alloy at a low cost and uniformly. The chromium-containing austenitic alloy according to the present invention can be used suitably as a member that is used in high-temperature water, such as a steam generator tubing, especially as a member for nuclear plant because Ni released amount is very low even if the Cr-containing austenitic alloy is used in a high-temperature water environment, for example, in a high-temperature water environment in a nuclear power generation plant for a long period of time.

MODE FOR CARRYING OUT THE INVENTION

1. Oxide Film

For the chromium-containing austenitic alloy according to the present invention, at least one surface of the alloy has to be provided with a continuous chromium oxide film with a thickness of 5 nm or more and less than 50 nm. By making the film thickness less than 50 nm, the occurrence of cracking, peeling, and the like of film can be suppressed. The film thickness is preferably 40 nm or less. Also, in order to form a continuous chromium oxide film steadily, the film thickness has to be 5 nm or more. The film thickness is preferably 10 nm or more.

The film thickness may be measured directly by using a scanning electron microscope (SEM) or a transmission electron microscope (TEM), or may be measured by depth direction analysis such as X-ray photoelectron spectroscopy (XPS), Auger electron spectroscopy (AES), or glow discharge optical emission spectroscopy (GDS). At this time, it should be remarked that, the average thickness of the whole of film is determined, for example, by measuring the film thickness in a plurality of locations and calculating the mean value.

In the present invention, the fact that the chromium oxide film formed on the alloy surface is continuous indicates that the base metal is not exposed. As a method for evaluating the continuity of oxide film, a critical passivation current density method can be used. As described in Non-Patent Document 1, the critical passivation current density method is one of the methods for examining physical defects such as a pinhole in a coating.

When the anode polarization measurement is made in a solution to which sodium thiosulfate is added to enhance the wettability to dilute sulfuric acid, in the case of an alloy formed with a continuous film having no physical defect, a maximum current density is determined to be a small value. On the other hand, in the case where the film has a physical defect and the alloy base metal is exposed, the value of the maximum corrosion current density increases. Therefore, there can be obtained an index as to whether or not a physical defect is present in the oxide film formed on the alloy surface, that is, as to whether or not the alloy surface is continuously covered with an oxide film and thereby the base metal is not exposed.

In order to obtain a continuous chromium oxide film with a thickness of 5 nm or more and less than 50 nm, it is important to make the film forming treatment conditions proper. Specifically, it is important to make oxygen potential, treatment temperature, and treatment time proper. In the ranges of oxygen potential, treatment temperature, and treatment time in which chromium oxides are formed, a film having the target thickness can be formed continuously by controlling the treatment time while the growth of chromium oxides is suppressed by keeping the oxygen potential and treatment temperature low.

As a method for controlling the oxygen potential, there is preferably used a method in which an oxidizing gas is contained in a non-oxidizing gas, and the oxygen potential is controlled by the concentration of oxidizing gas. In the method in which the oxygen potential is controlled by the degree of vacuum, it is difficult to precisely control the oxygen potential because a plurality of kinds of oxidizing gases, such as oxygen and water vapor, are contained. As the non-oxidizing gas, rare gas, such as argon, hydrogen gas, and the like are exemplified. As the oxidizing gas, water vapor, carbon dioxide, oxygen gas, and the like are cited.

The oxygen gas has a danger of explosion when hydrogen is used as the non-oxidizing gas. Also, when carbon dioxide is used as the oxidizing gas, the alloy outer layer is carburized by carbon monoxide produced after metal oxidation, and the corrosion resistance may be decreased by the enhancement in grain boundary strength. Therefore, as the oxidizing gas, water vapor is most favorable.

If the concentration of water vapor is too low, no oxide film is formed, and if it is too high, components other than chromium are oxidized, and a pure chromium oxide film is less liable to be obtained. Therefore, the concentration of water vapor is preferably 500 to 15,000 ppm. The concentration of water vapor is more preferably 1000 ppm or higher, and further preferably 3000 ppm or higher.

The film forming treatment temperature has only to be controlled to form a proper film thickness in view of the above-described oxygen potential and treatment time. In the ordinary heat treatment process, an alloy is heated to a predetermined treatment temperature, being held at the treatment temperature, and thereafter is cooled. The film forming treatment is performed by exposing an alloy to an oxidizing atmosphere during the time from when the temperature rise is started and the alloy surface temperature rises to 500° C. to when the predetermined temperature is reached (heating stage), during the time when the alloy is held at the predetermined temperature (holding stage), and during the time from when cooling is started to when the alloy surface temperature lowers to 500° C. (cooling stage) in the above-described treatment process. The alloy may be exposed to the oxidizing atmosphere continuously at all of the above-described stages, or, for example, either one of heating stage, holding stage, and cooling stage or a plurality of these stages may be selected as appropriate, and the film may be formed by being exposed to the oxidizing atmosphere at these stages.

Also, the film forming treatment temperature in the present invention means a temperature range in which an alloy is exposed to the oxidizing atmosphere to form a film on the alloy surface. In the case where the alloy is exposed to the oxidizing atmosphere at all stages of heating stage, holding stage, and cooling stage, the temperature range from 500° C., at which a film having a uniform thickness can be formed, to the temperature at which the alloy is heated and held was made the film forming treatment temperature. For example, in the case where the alloy is exposed to the oxidizing atmosphere at only the holding stage, at which the alloy is held at the predetermined temperature, not at all stages, the film forming treatment temperature is the holding temperature. Also, the holding temperature may be changed stepwise during the treatment.

If the treatment temperature for film formation is lower than 500° C., the oxidation of chromium is very slow, and therefore this treatment temperature is not realistic. On the other hand, if the treatment temperature is higher than 750° C., the oxidation rate is too high, and it is difficult to control the uniform film thickness. Therefore, the treatment temperature is preferably in the range of 500 to 750° C.

The film forming treatment time has only to be controlled to form a proper film thickness in view of the above-described oxygen potential and treatment temperature. The film forming treatment time means time during which the alloy is exposed to the oxidizing atmosphere at the above-described heating stage, holding stage, and cooling stage. Further, the time during which the alloy is exposed to the oxidizing atmosphere at each of the stages is called "heating time", "holding time", and "cooling time", and the total time at all of the stages is called "film forming treatment time" or simply called "treatment time".

In order to form an oxide film consisting mainly of chromium oxides, the film forming treatment time is preferably made 1 minute or longer. On the other hand, even if heating treatment is performed for a time period longer than three hours, the oxide film scarcely grows, and the long treatment time is disadvantageous in terms of production cost as well. Therefore, the treatment time is preferably three hours or shorter. The treatment time is further preferably five minutes or longer, and further preferably 100 minutes or shorter. Also, if the film forming treatment temperature is 600° C. or higher, the treatment time is preferably one hour or shorter.

When the film forming treatment is performed, to obtain proper mechanical properties of material, annealing treatment can be performed in advance. Also, to improve the corrosion resistance of crystal grain boundary, heat treatment at 700 to 750° C. for 5 to 15 hours may be performed before and after the film forming treatment or simultaneously therewith.

2. Chemical Composition

Although the chemical composition of the base metal of the chromium-containing austenitic alloy according to the present invention is not particularly limited, the chemical composition preferably consists of, by mass percent, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

The "impurities" are herein elements that are mixed in by various factors in the production process including raw materials such as ore or scrap when an alloy is produced on an industrial scale, and are allowed to be contained within the range such that the elements do not exert an adverse influence on the present invention.

The reason why the content of each element is restricted is explained below. In the explanation below, the symbol "%" of the content of each element means "mass percent".

C: 0.15% or Less

C (carbon) may be contained because of having an effect of enhancing the grain boundary strength of alloy. However, if more than 0.15% of C is contained, the stress corrosion cracking resistance may be deteriorated. If C is contained, the content thereof is preferably 0.15% or less. The C content is further preferably 0.06% or less. In order to achieve the above-described effect, the C content is preferably 0.01% or more.

Si: 1.00% or Less

Si (silicon) is used as a deoxidizer at the time of smelting, and remains in the alloy as an impurity. If the content of Si is excessive, the cleanliness of alloy may decrease. Therefore, the content of Si is preferably 1.00% or less, further preferably 0.50% or less. The effect of Si as a deoxidizer is remarkable when the Si content is 0.05% or more.

Mn: 2.0% or Less

Mn (manganese) is an element effective in immobilizing S as MnS and ensuring the hot workability. For Mn, the free energy of formation of oxide is lower than that of Cr. Also, Mn is precipitated as $MnCr_2O_4$ by heating. Further, since the diffusion velocity is relatively high, usually, $Cr_2O_3$ is preferentially produced near the base metal by heating, and $MnCr_2O_4$ is produced as an upper layer on the outside thereof. If the $MnCr_2O_4$ layer is present, the $Cr_2O_3$ layer is protected in environments of usage. Also, even if the $Cr_2O_3$ layer is broken for some reasons, the restoration of $Cr_2O_3$ is accelerated by $MnCr_2O_4$. However, if Mn is contained excessively, the corrosion resistance of alloy may decrease. Therefore, the content of Mn is preferably 2.0% or less, further preferably 1.0% or less. In order to achieve the above-described effect, the Mn content is preferably 0.1% or more, and further preferably 0.2% or more.

P: 0.030% or Less

P (phosphorus) is an element that is present in the alloy as an impurity. If the P content is more than 0.030%, the corrosion resistance may be adversely affected. Therefore, the P content is preferably 0.030% or less.

S: 0.030% or Less

S (sulfur) is an element that is present in the alloy as an impurity. If the S content is more than 0.030%, the corrosion resistance may be adversely affected. Therefore, the S content is preferably 0.030% or less.

Cr: 10.0 to 40.0%

Cr (chromium) is an element necessary for producing an oxide film consisting of chromium oxides. In order to produce such an oxide film on the surface of alloy, it is desirable to contain 10.0% or more of Cr. However, if the Cr content is more than 40.0%, the workability may be deteriorated. Therefore, the Cr content is preferably 10.0 to 40.0%.

Ni: 8.0 to 80.0%

Ni (nickel) is an element necessary for ensuring the corrosion resistance of the austenitic alloy, and therefore 8.0% or more of Ni is preferably contained. On the other hand, since Ni is expensive, the minimum necessary amount of Ni has only to be contained depending on the intended use, and therefore the Ni content is preferably 80.0% or less. The Ni content is further preferably 45.0% or more.

Ti: 0.5% or Less

Ti (titanium) is an element effective in improving the workability of alloy and suppressing the grain growth during welding. However, if the Ti content is more than 0.5%, the cleanliness of alloy may decrease. Therefore, the Ti content is preferably 0.5% or less, further preferably 0.4% or less. In order to achieve the above-described effects, the Ti content is preferably 0.1% or more.

Cu: 0.6% or Less

Cu (copper) is an element that is present in the alloy as an impurity. If the Cu content is more than 0.6%, the corrosion resistance of alloy may decrease. Therefore, the Cu content is preferably 0.6% or less.

Al: 0.5% or Less

Al (aluminum) is used as a deoxidizer at the time of steel making, and remains in the alloy as an impurity. The remaining Al turns to an oxide-base inclusion in the alloy, decreases the cleanliness of alloy, and may exert an adverse influence on the corrosion resistance and mechanical properties of alloy. Therefore, the Al content is preferably 0.5% or less.

N: 0.20% or Less

N (nitrogen) need not be contained; however, in the chromium-containing austenitic alloy, which is an object of the present invention, about 0.01% of N is usually contained as an impurity. However, if N is contained positively, the strength can be enhanced without deterioration in the corrosion resistance. However, if more than 0.20% of N is contained, the corrosion resistance decreases. Therefore, the upper limit of the content of N, if contained, is 0.20%.

Two kinds of the chromium-containing austenitic alloys having the typical chemical compositions are as follows:

(a) A nickel-based alloy consisting of C: 0.15% or less, Si: 1.00% or less, Mn: 2.0% or less, P: 0.030% or less, S: 0.030% or less, Cr: 14.0 to 17.0%, Fe: 6.0 to 10.0%, Ti: 0.5% or less, Cu: 0.5% or less, and Al: 0.5% or less, the balance being Ni and impurities.

(b) A nickel-based alloy consisting of C: 0.06% or less, Si: 1.00% or less, Mn: 2.0% or less, P: 0.030% or less, S: 0.030% or less, Cr: 27.0 to 31.0%, Fe: 7.0 to 11.0%, Ti: 0.5% or less, Cu: 0.5% or less, and Al: 0.5% or less, the balance being Ni and impurities.

The alloy of the above item (a) is an alloy excellent in corrosion resistance in an environment containing chlorides because of containing 14.0 to 17.0% of Cr and 70 to 80% of Ni. In this alloy, the Fe content is preferably 6.0 to 10.0% from the viewpoint of the balance between the Ni content and the Cr content.

The alloy of the above item (b) is an alloy excellent in corrosion resistance not only in an environment containing chlorides but also in an environment of pure water and alkali at high temperatures because of containing 27.0 to 31.0% of Cr and 55 to 65% of Ni. In this alloy as well, the Fe content is preferably 7.0 to 11.0% from the viewpoint of the balance between the Ni content and the Cr content.

Hereunder, the present invention is explained more specifically with reference to examples; however, the present invention is not limited to these examples.

Example 1

An alloy (690 alloy) having the chemical composition given in Table 1 was melted in a vacuum and was cast to obtain an ingot. The ingot thus obtained was hot-forged to produce a billet. The obtained billet was hot-worked and cold-worked into a tube shape having an outside diameter of 19 mm and a wall thickness of 1 mm. After annealing heat treatment had been performed at a temperature of 1100° C., film forming treatment onto the tube inner surface was accomplished under the conditions given in Table 2.

The film forming treatment was performed by flowing oxidizing gas having a predetermined concentration into each of alloy tubes during the time when the tube was heated to a predetermined temperature in a furnace, being held, and was cooled. As described above, the "film forming treatment temperature" in Table 2 means the temperature range in which the alloy tube is exposed to the oxidizing atmosphere, the "heating time", "holding time", and "cooling time" mean time periods for which the alloy tube is exposed to the oxidizing atmosphere at respective stages, and the "film forming treatment time" means total treatment time at all of the stages.

TABLE 1

| Chemical composition (in mass %, balance: Fe and impurities) | | | | | | | | | | |
|---|---|---|---|---|---|---|---|---|---|---|
| C | Si | Mn | P | S | Cr | Ni | Ti | Cu | Al | N |
| 0.018 | 0.32 | 0.31 | 0.013 | 0.001 | 29.6 | 59.5 | 0.25 | 0.04 | 0.14 | 0.007 |

* indicates that conditions do not satisfy those defined by the present invention.

TABLE 2

| | | Film forming | Film forming treatment time | | | | Maximum current | Ni | | |
|---|---|---|---|---|---|---|---|---|---|---|
| Test No. | H$_2$O concentration (ppm) | treatment temperature (° C.) | Heating time[#1] (h) | Holding time[#2] (h) | Cooling time[#3] (h) | Film thickness (nm) | density by CPCD measurement (µA/cm$^2$) | released amount (g/cm$^2$) | Result of bending test | |
| 1 | 3000 | 725 | 0 | 0.3 | 0 | 40 | 0.03 | 0.0003 | ○○ | Inventive |
| 2 | 12000 | 725 | 0 | 0.2 | 0 | 44 | 0.03 | 0.0003 | ○ | example |
| 3 | 3000 | 600 | 0 | 0.5 | 0 | 32 | 0.05 | 0.0005 | ○○ | |
| 4 | 3000 | 725 | 0 | 0.1 | 0 | 25 | 0.08 | 0.0007 | ○○ | |
| 5 | 12000 | 500 | 0 | 3 | 0 | 30 | 0.05 | 0.0006 | ○○ | |
| 6 | 12000 | 500-700 | 0.1 | 0.3 | 0 | 43 | 0.03 | 0.0003 | ○ | |
| 7 | 12000 | 500-700 | 0 | 0.3 | 0.1 | 44 | 0.03 | 0.0003 | ○ | |
| 8 | 12000 | 600 | 0 | 0.3 | 0 | 33 | 0.03 | 0.0003 | ○○ | |
| 9 | 6000 | 600 | 0 | 0.3 | 0 | 30 | 0.03 | 0.0003 | ○○ | |

TABLE 2-continued

| Test No. | H$_2$O concentration (ppm) | Film forming treatment temperature (° C.) | Film forming treatment time Heating time[#1] (h) | Holding time[#2] (h) | Cooling time[#3] (h) | Film thickness (nm) | Maximum current density by CPCD measurement (μA/cm$^2$) | Ni released amount (g/cm$^2$) | Result of bending test | |
|---|---|---|---|---|---|---|---|---|---|---|
| 10 | 10 | 725 | 0 | 10 | 0 | 3 * | 110 * | 0.0012 | ∘∘ | Comparative example |
| 11 | 500 | 1100 | 0 | 0.03 | 0 | 46 | 8.3 * | 0.0010 | ∘ | |
| 12 | 12000 | 800 | 0 | 0.3 | 0 | 70 * | 0.03 | 0.0003 | x | |
| 13 | 3000 | 725 | 0 | 5 | 0 | 140 * | <0.01 | 0.0004 | x | |

[#1] means time from when the temperature rise is started and the alloy surface temperature rises to 500° C. to when the predetermined temperature is reached during which the alloy is exposed to the oxidizing atmosphere.
[#2] means time when the alloy is held at the predetermined temperature during which the alloy is exposed to the oxidizing atmosphere.
[#3] means time from when cooling is started to when the alloy surface temperature lowers to 500° C. during which the alloy is exposed to the oxidizing atmosphere.

Concerning the film thickness, measurement was made in five optional locations of a SEM image (magnification: ×100,000), and the mean value of five measured values was made a film thickness. Also, there was prepared a test specimen in which a 10 mm×10 mm region on the inner surface was made a surface to be measured, the critical passivation current density (CPCD) measurement was carried out with a degassed 0.1M sulfuric acid+0.01M sodium thiosulfate solution having a temperature of 30° C., and the maximum current density was determined. The result is also given in Table 2.

Also, the Ni release resistance of test material was evaluated as described below by using the above-described specimens. After being filled with a fixed amount of solution simulating a nuclear reactor primary system, the test tube was sealed at both ends by using a titanium-made lock, and a release test was conducted in an autoclave. The simulating solution was distilled water containing 500 ppm of B and 2 ppm of Li. After degassing had been performed by bubbling the solution with high purity argon gas, a gaseous mixture of hydrogen and argon was pressurized, whereby the solution was made such as to correspond to dissolved hydrogen 30 cc—STP/kgH$_2$O. The test temperature was set at 325° C., and the test time was set at 500 hours. Immediately after the test had been finished, the solution was analyzed by using an inductively coupled plasma mass spectrometer (ICP-MS), and the amount of released Ni ion per unit surface area (g/m$^2$) of the test specimen was examined. The examination result is also given in Table 2.

The adhesion of film was examined by the cracking observation after a bending test. The surface-treated specimen was cut into longitudinally halved shapes each having a length of 80 mm, and thereafter each of the halved specimens was supported at both ends with supports with the tube inner surface being directed to the downside so as to be in parallel with each other. The interval between the supports was 50 mm. Thereafter, 8 mm-R jig was pressed against a portion near the center in the longitudinal direction from the upside, and inverse U-shaped bending was performed. Concerning the pressing lengths, the pressing length of one of the halved specimen was about 20 mm, and that of the other was about 30 mm. Subsequently, the inner surface was observed by using a SEM at a magnification of ×2000. In both of the bending tests in which the pressing lengths are 20 mm and 30 mm, the tube specimen in which no crack was observed was evaluated as ∘∘, the tube specimen in which a crack was recognized in the 30 mm bending test but no crack was observed in the 20 mm bending test was evaluated as ∘, and the tube specimen in which a crack was observed in both of the 20 mm and 30 mm bending tests was evaluated as x.

As can be seen from Table 2, in test Nos. 10 and 11, which were comparative examples, the Ni release resistance was poor because the film was not continuous. Also, in test Nos. 12 and 13, although the film thickness was thick, and the Ni release resistance in release test was good, a crack was recognized in the bending test. In contrast, in test Nos. 1 to 9, which were inventive example, the Ni release resistance was excellent, and no crack occurred because the film was formed uniformly although the thickness thereof was thin.

INDUSTRIAL APPLICABILITY

According to the present invention, a chromium oxide film can be formed on the surface of the chromium-containing austenitic alloy at a low cost and uniformly. The chromium-containing austenitic alloy according to the present invention can be used suitably as a member that is used in high-temperature water, such as a steam generator tubing, especially as a member for nuclear plant because Ni released amount is very low even if the Cr-containing austenitic alloy is used in a high-temperature water environment, for example, in a high-temperature water environment in a nuclear power generation plant for a long period of time.

What is claimed is:

1. A chromium-containing austenitic alloy wherein a chemical composition of a base metal consists of, by mass percent, C: 0.15% or less, Si: 1.00% or less, Mn: 2.0% or less, P: 0.030% or less, S: 0.030% or less, Cr: 10.0 to 40.0%, Ni: 55 to 80.0%, Ti: 0.5% or less, Cu: 0.6% or less, Al: 0.5% or less, and N: 0.20% or less, the balance being Fe and impurities, wherein at least one surface of the surfaces of the alloy has a continuous chromium oxide film with a thickness of 5 nm or more and less than 50 nm and further wherein a maximum current density determined by a critical passivation current density is 0.1 μA/cm$^2$ or lower.

2. The chromium-containing austenitic alloy according to claim 1, wherein the alloy is used as a member for a nuclear plant.

* * * * *